INVENTOR.
LESLIE E. SODERQUIST
BY Hamilton & Cook
ATTORNEYS

INVENTOR.
LESLIE E. SODERQUIST
BY Hamilton & Cook
ATTORNEYS

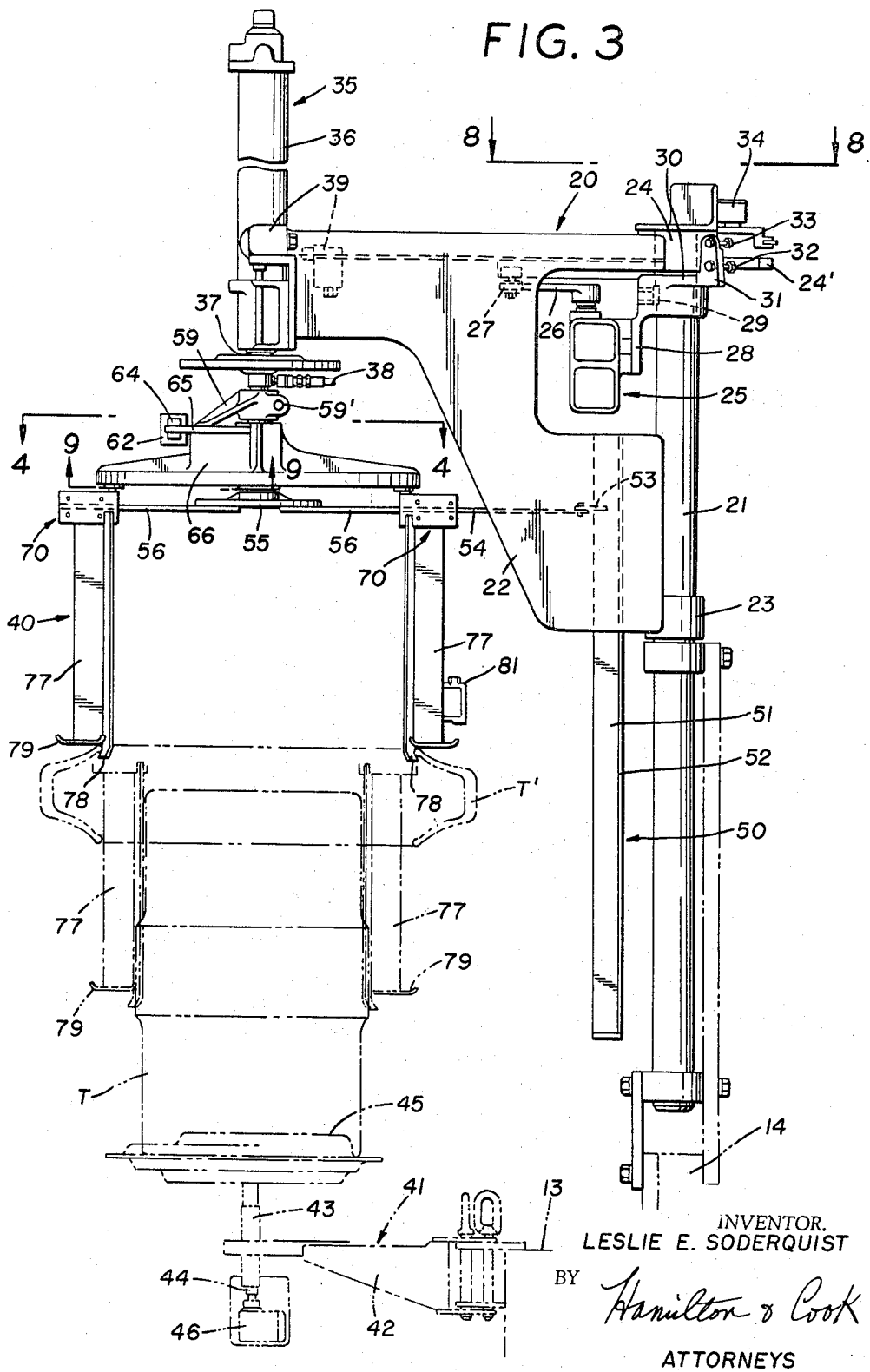

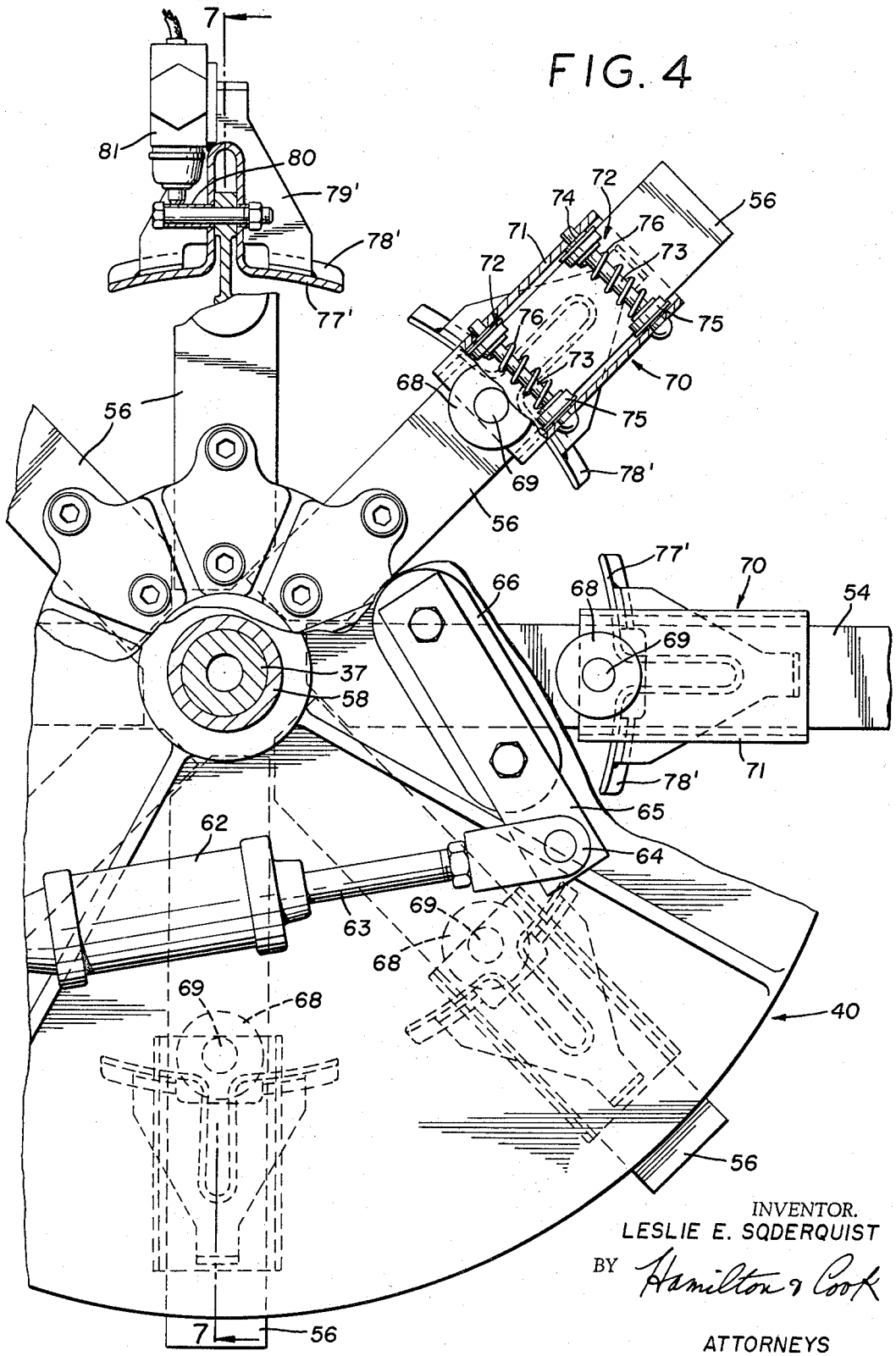

April 30, 1968   L. E. SODERQUIST   3,380,115
UNIVERSAL TIRE PRESS LOADER
Filed Jan. 28, 1966   7 Sheets-Sheet 5

INVENTOR.
LESLIE E. SODERQUIST
BY Hamilton & Cook
ATTORNEYS

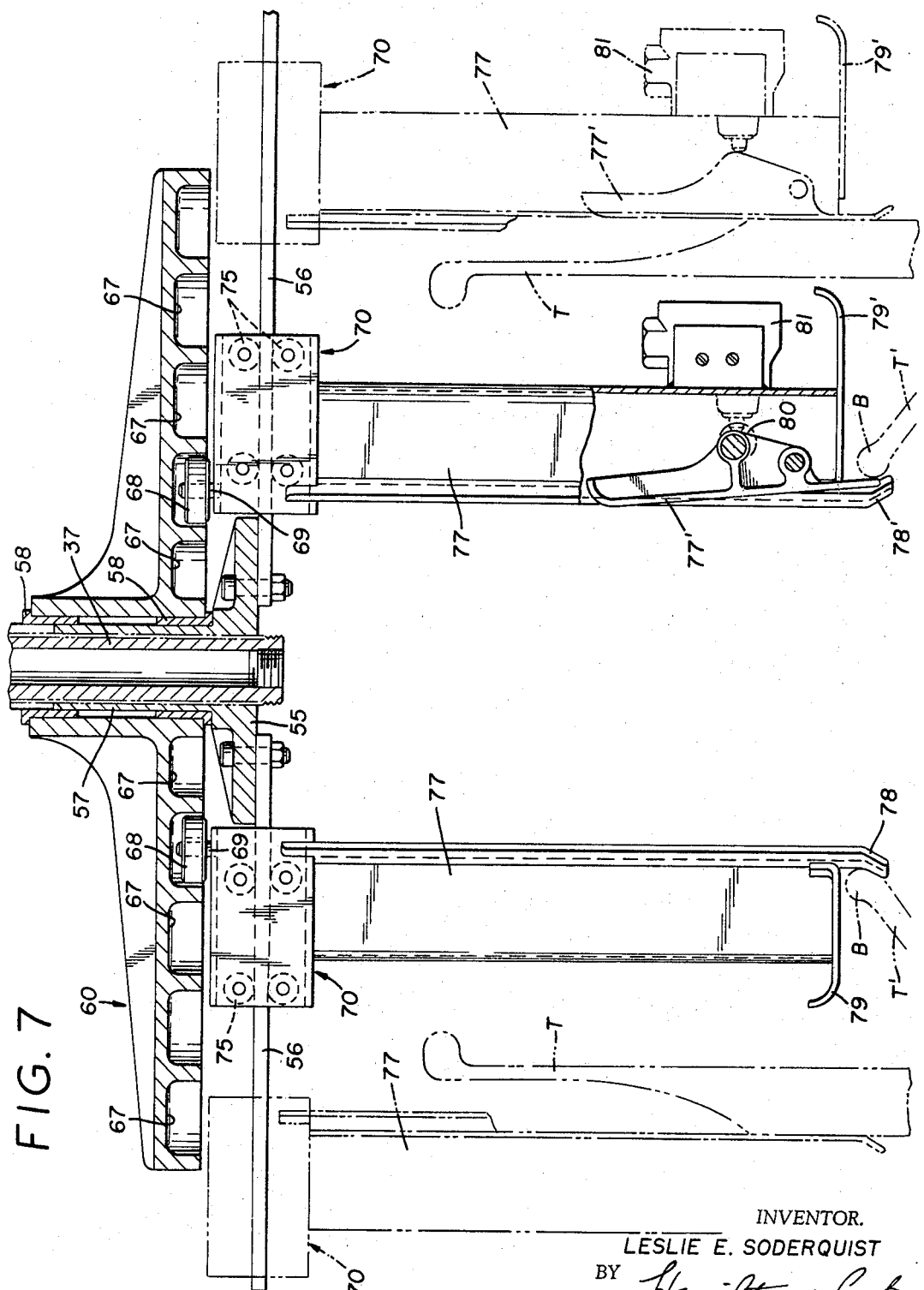

April 30, 1968   L. E. SODERQUIST   3,380,115
UNIVERSAL TIRE PRESS LOADER

Filed Jan. 28, 1966   7 Sheets-Sheet 7

INVENTOR.
LESLIE E. SODERQUIST
BY *Hamilton & Cook*
ATTORNEYS

United States Patent Office 3,380,115
Patented Apr. 30, 1968

3,380,115
UNIVERSAL TIRE PRESS LOADER
Leslie E. Soderquist, Silver Lake, Ohio, assignor to McNeil Corporation, Akron, Ohio, a corporation of Ohio
Filed Jan. 28, 1966, Ser. No. 523,650
8 Claims. (Cl. 18—2)

ABSTRACT OF THE DISCLOSURE

Automatic loading apparatus for use with tire presses. The loader has band gripping elements selectively adjustable by rotating cam means for various shapes, heights, and widths of tire bands.

---

The present invention relates generally to improved automatic apparatus for loading unvulcanized tire bands into tire presses for shaping and curing tires within opposed separable or relatively movable top or upper and bottom or lower mold sections or halves. More particularly, the invention relates to improved automatic press loaders of the type operative to provide at least two unvulcanized tire bands ahead of each pair of mating mold sections of a press. More specifically, the present invention relates to such an improved vertical boom automatic press loader adapted for swinging or rotating a tire band on a chuck or holder and loading the tire band into concentric registry with the lower mold section of the press, the loader having an improved universal chuck or holder adapted to accommodate a wide variety and range of tire band constructions and sizes.

Automatic tire press loading concepts have been disclosed in a number of prior patents granted to the present inventor and owned by the assignee of the present application, including U.S. Patent Nos. 2,927,343; 2,976,566; 2,997,738; 3,030,658; 3,134,136; and 3,167,810; the latter two patents disclosing types of boom loaders. These automatic loading concepts have contributed to the progress and enrichment of the art by eliminating tedious and inefficient manual press loading operations, thereby increasing press productivity and enhancing product quality and uniformity by minimizing the factor of human error inherent in prior manual loading methods.

Other prior press loader concepts have contemplated utilization of specific loader and press constructions, including basket-type tire band holders or chucks on elevator mechanisms carried on the upper press head or top mold section of a tire press having opening and closing movements of a rectilinear vertical and lateral character.

While such press loaders have employed tire band chuck or holder mechanisms capable of gripping a band by its exterior or interior surfaces or by its upper bead regions, all such devices have required time-consuming manual adjustment or part change-overs to accommodate the variegated sizes and types of tire band constructions, thereby increasing press downtime and diminishing productivity. Furthermore, the manual adjustment and change-over methods are inherently inaccurate due to the attendant limitations of human error, creating possibilities of loading misregistry or tire band damage or deformation. Moreover, in certain types of prior boom loaders, the pendulous weight of the suspended chuck or holder devices, in conjunction with the occasionally erratic operation of the boom swinging or rotating mechanism, has sometimes produced undesirable spurious oscillations in the boom movement, resulting in misalignment of the chuck or holder and the tire band thereon with respect to the lower mold section of the press.

The problems thus posed by prior press loader constructions have become more acute with the proliferation of tire sizes and constructions required by the present market, involving a wide range of bead diameters and axial lengths or heights or "widths" and a variety of construction configurations, including both bias ply and radial ply constructions. And the problems have been compounded by the further requirements that the presses and associated loaders accommodate partially shaped or preformed tire bands as well as conventional flat "pully band" tire bands. Added significance and urgency have been imparted to these problems by the advent of more rigid tire industry requirements for precision quality and defect control consistent with high levels of productivity.

It is, therefore, an object of the present invention to improve the operation of automatic loading apparatus for loading unvulcanized tire bands into presses for final shaping and curing of tires.

It is a further object of the present invention to provide improved automatic tire press loading apparatus for locating and positioning unvulcanized tire bands in operative concentric registry in the open press.

It is a still further object of the invention to furnish improved automatic tire band loading apparatus having an improved universal band holder or chuck mechanism automatically operable to accommodate a variety of sizes and types of bands and capable of selectively gripping an uncured tire band by its exterior surfaces or by its upper bead regions.

It is yet a further object to provide such a universal chuck mechanism having a wide range of diameter adjustment which at the same time maintains relatively constant holding pressures or forces on the inner or outer diameter of the tire band.

It is yet another object of the invention to furnish improved loading apparatus as aforesaid which can be utilized efficiently for automatic loading of a tire shaping and curing press with minimum delay for manual adjustment and servicing and a minimum degree of superintendence.

These and other objects and advantages of the invention will be apparent in view of the following detailed description of one preferred embodiment when read in conjunction with the attached drawings.

In the drawings:

FIG. 1 is a front elevational view, partially sectional, of a dual mold tire shaping and curing press having automatic loading apparatus according to a preferred form of the present invention, depicting the loading of a partially shaped or preformed band, such as a radial ply tire band, at the left side and illustrating the loading of a conventional flat-built band, such as a bias ply tire band, at the right side;

FIG. 3 is an elevational side view of the loader generally on line 3—3 in FIG. 2;

FIG. 4 is an enlarged partially fragmentary top sectional view taken at lines 4—4 in FIG. 3;

FIG. 7 is a sectional view taken at lines 7—7 in FIG. 4;

In general, the invention relates to an improved tire band loader having a novel universal band holder or chuck mechanism with radially movable cam-actuated band gripping paddles adapted to grip the band by its exterior surfaces or by the interior of its upper bead regions. The improved loader preferably comprises a rotatable horizontal boom powered by a radial movement fluid motor and having a vertical guide member thereon, the band holder mechanism being suspended from the boom for vertical reciprocation and having a guide follower coacting with the guide member during reciprocation to maintain concentric registry and alignment of the band with the press mold section during loading.

Figure 1:
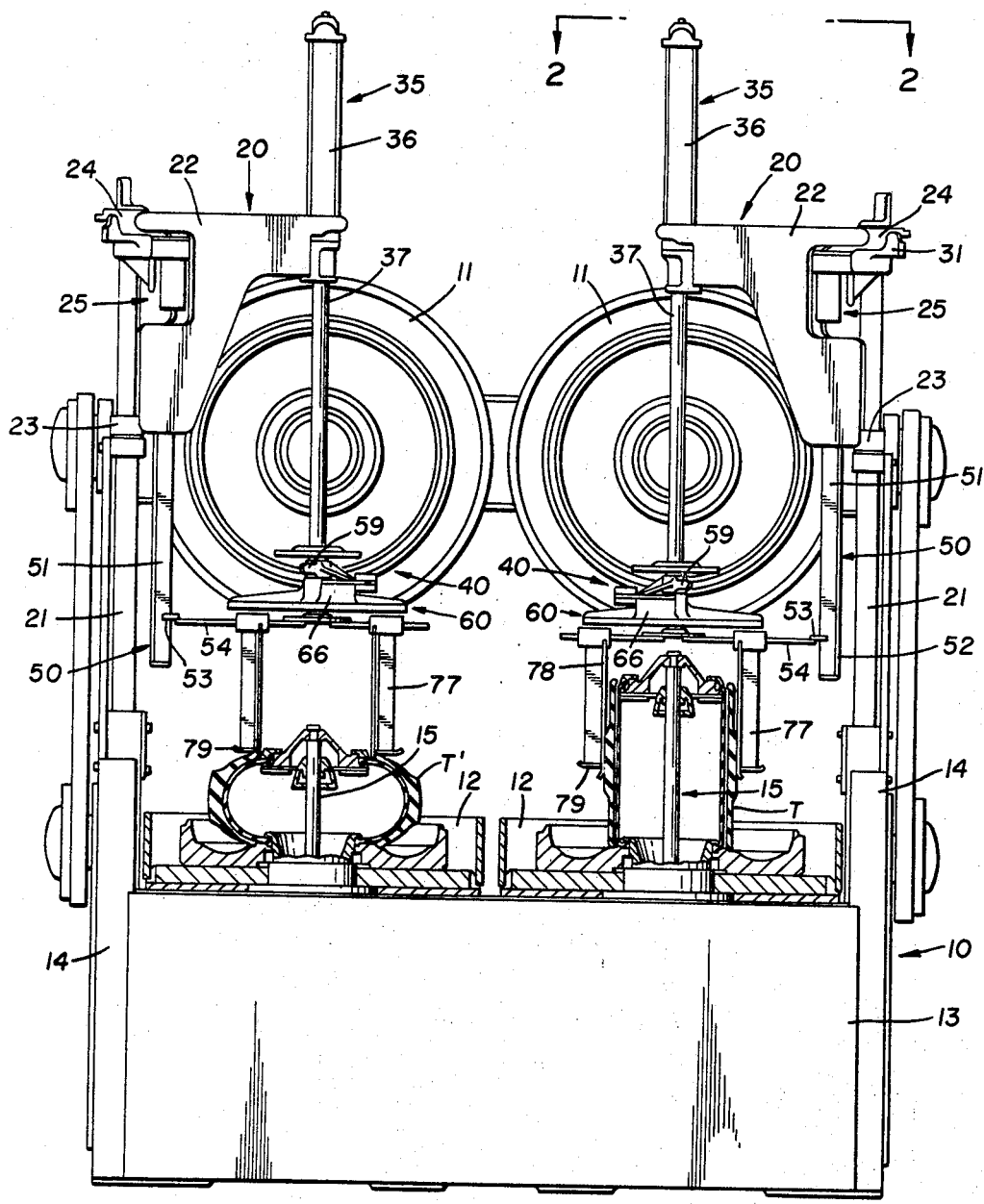

Referring to FIG. 1, a dual tire shaping and curing press is indicated generally by the numeral 10 as comprising movable top mold sections 11 and bottom mold sections 12 mounted on a press base or bed 13 having side frames 14. Suitable tire presses are disclosed in a number of prior art patents, including for example the present inventor's U.S. Patent No. 2,808,618. The presses are preferably equipped with permanent bag or diaphragm center shaping mechanisms 15, as disclosed in the inventor's copending applications Ser. No. 341,999, filed Feb. 3, 1964, now Patent No. 3,260,782, and Ser. No. 503,833, filed Oct. 23, 1965, now Patent No. 3,336,635. Furthermore, for optimum press productivity and operational efficiency, the press 10 is preferably equipped with automatic unloading apparatus (not shown) to unload the finished shaped and cured tire and discharge it to the rear of the press. Suitable concepts for automatic unloading apparatus are disclosed, for example, in the inventor's prior U.S. Patent Nos. 2,832,991, 2,832,992, and 3,141,191.

The improved automatic tire band loading apparatus is designated generally in the drawings by the numeral 20, and in FIG. 1 the apparatus is shown on the right-hand side loading a conventional flat-built bias ply tire band T over the center mechanism 15 and into concentric registry with the lower press mold section 12. On the left-hand side, a partially shaped preformed radial ply tire band T' is shown being loaded.

Figure 2:
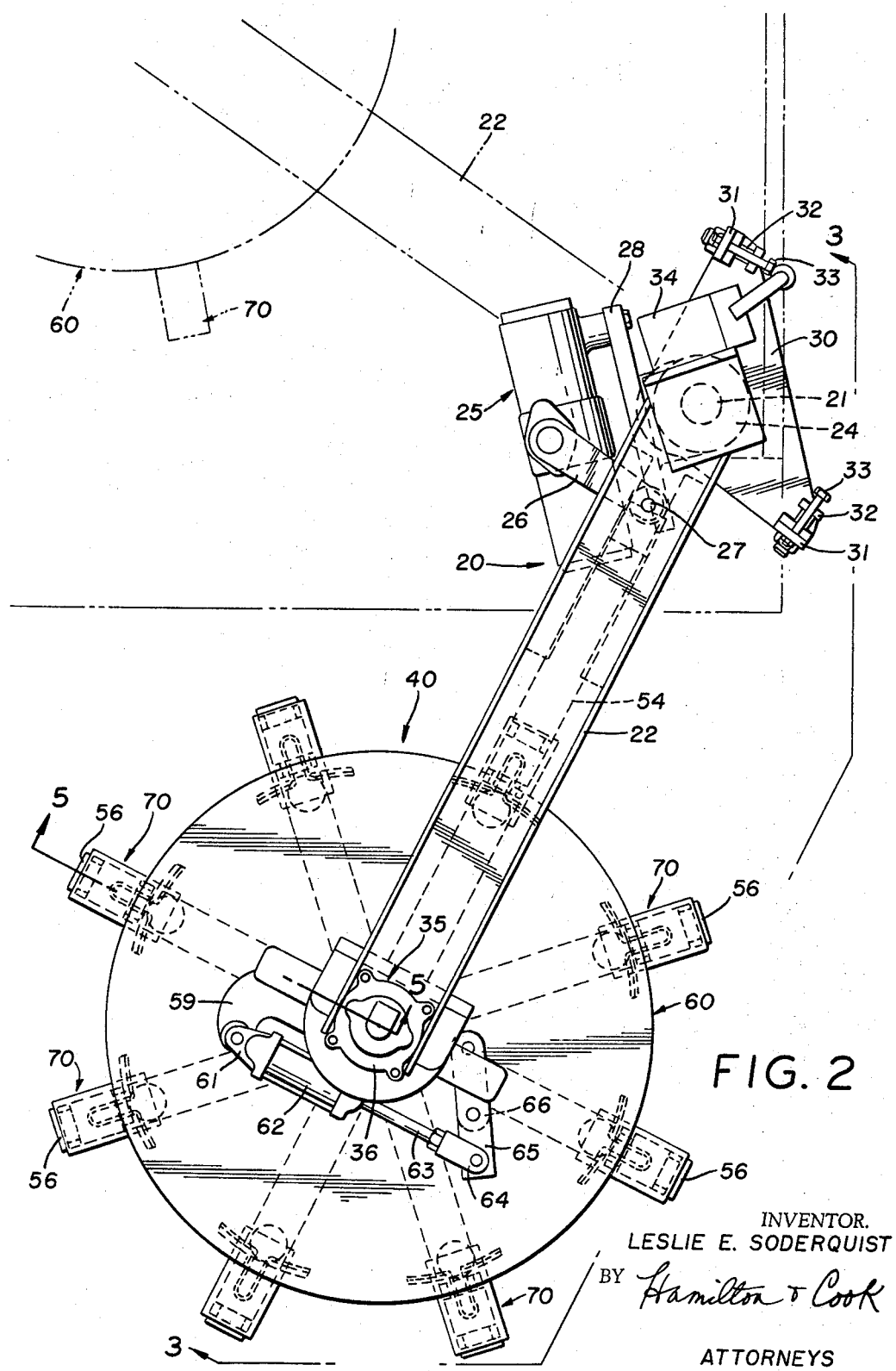
FIG. 2 is a top or plan view taken substantially at line 2—2 in FIG. 1, except that the tire band loader has been swung or rotated outwardly from the press mold loading position indicated by phantom lines.
Figure 8:
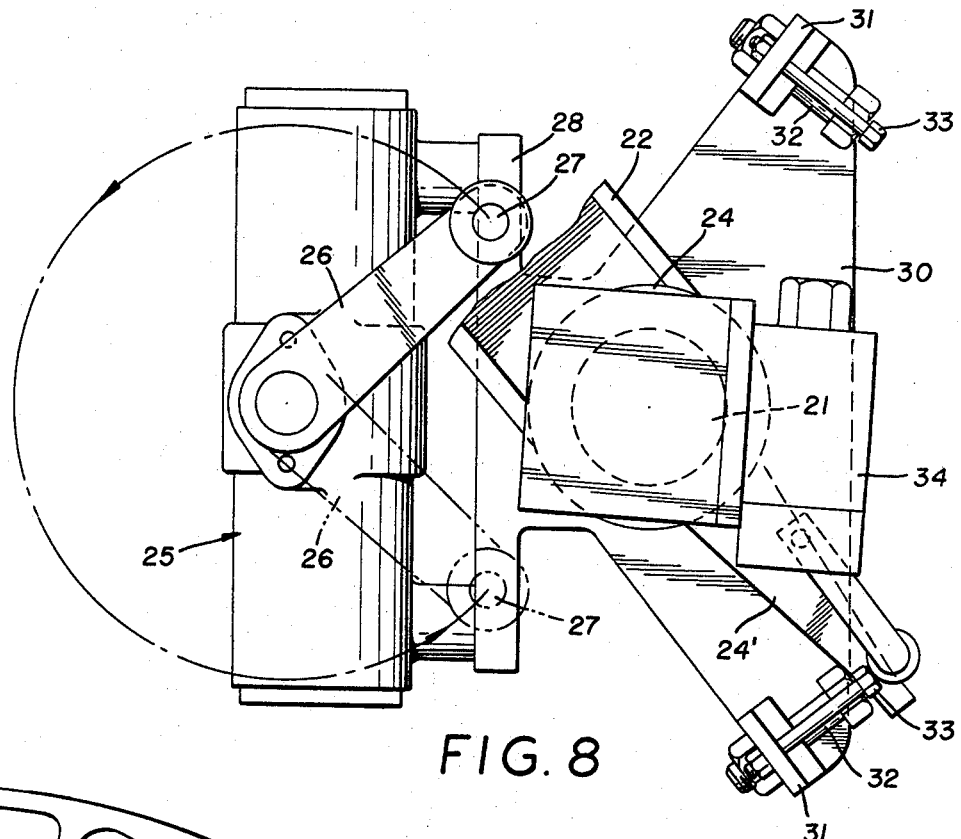
FIG. 8 is an enlarged top plan view taken at lines 8—8 in FIG. 3.

Each loader 20 has a vertical mast or stanchion 21 fixed or mounted on the press side plate member 14 or press bed 13 near a front corner of the press 10. A horizontally extending jib arm or boom member 22 is rotatably journaled for arcuate swinging movement thereof on the mast or stanchion 21 by lower bearing collar 23 and uper bearing collar 24. Referring particularly to FIGS. 2, 3, and 8, selective rotation or arcuate movement of the loader jib arm or boom 22 is powered by a double-acting radial movement fluid motor or air cylinder device 25 through its rotating arm 26 which is pivot-connected to boom 22 by pin 27. The radial movement fluid motor 25 is mounted on a collar bracket 28 secured to the vertical mast or stanchion 21 as by key 29.

Collar bracket 28 is formed at its upper end into a horizontally disposed generally triangular plate 30, the fluid motor 25 being oriented at its vertex. Each base juncture of the triangular plate 30 has formed thereon a vertically directed ear 31 through which a horizontal adjustable stop bolt 32 is threaded. Stop bolts 32 abut a lug projection 24' on the upper collar bearing 24 of the boom 22 sequentially at the terminus of inward and outward rotational or swinging travel of the boom 22, thus affording adjustment of these terminal points. Horizontal limit switch actautor bolts 33 are also threaded into ears 31 for sequential actuation of an electrical limit switch 34 carried on the upper rotating collar bearing 24 of the boom 22. The resultant sequential actuation of the switch 34 at the terminal points of inward and outward rotational travel of the boom 22 senses loader location and produces an electrical signal which is fed to the master electrical controller (not shown) which initiates, coordinates, and controls the sequential operations of the loaders 20 and press 10.

Referring now to FIGS. 1–3, a vertically disposed reciprocating fluid motor or air cylinder 35 is mounted on the outer end of each loader jib arm or boom 22 by securing its cylinder casing 36 thereto. A piston rod 37 is carried in the cylinder casing 36 for reciprocation therein upon introduction or exhaust of fluid pressure through conduit fitting 38. In the preferred embodiment, a single-acting air cylinder 35 is supplied with air pressure through conduit fitting 38 to raise the piston rod 37. The piston rod 37 is lowered in a controlled manner under the influence of gravity by controlling the air exhaust through the conduit fitting 38, as by sequentially connecting it to an orifice exhaust valve (not shown).

A pair of electrical limit switches 39 (FIG. 3) are mounted on the boom 22 near the air cylinder 35 and are positioned to be actuated sequentially by a conventional actuator rod or mechanism (not shown) movable with the piston rod 37 or in response to its reciprocating travel. Switches 39 thus sense the termination of upward and downward travel of the piston rod 37, producing a signal which is fed to the above-mentioned master press and loader electrical controls.

A tire band holder or chuck mechanism, which will be described in detail hereinafter and is designated generally in the drawings by the numeral 40, is carried on the lower end of piston rod 37 for vertical travel therewith.

The above-described controlled lowering of the overhead piston rod 37 and the tire band holder mechanism 40 thereon, in part, constitutes a personnel safety measure to protect workmen from injury due to an otherwise possible sudden gravity descent of the heavy holder mechanism 40 in the event of air supply or related electrical failure. The controlled lowering also prevents damage to the tire bands (T or T'), the lower mold sections 12, or the center mechanisms 15 which might result from sudden descent of the band holder mechanisms 40 in possible cases of maladjustment of the vertical and rotational movement of the loader 20.

Referring particularly to FIG. 3, while the band holder mechanism 40 and the loader 20 may be adapted to grip and pick up a tire band (T or T') from the factory floor or any suitable supply platform or conveyor properly positioned in front of the press 10, the loader 20 preferably employs a tire band support mechanism 41 mounted in a shelf-like manner from the front of the press base 13. For partially shaped, preformed, or radial ply tire bands, a tire band support mechanism may be provided and utilized as disclosed in the copending application of L. E. Soderquist et al. for "Tire Support," U.S. Patent No. 3,337,173 issued Aug. 22, 1967.

As shown in phantom lines in FIG. 3, for conventional flat-built or bias ply tire bands T, the tire support mechanism 41 is preferably of the pan-platform type having a cantilever support arm 42 attached to the press bed 13 and a vertically disposed and adjustable threaded shaft 43 carried in a threaded bore at its outer end. Extending coaxially through the threaded shaft 43 is a shaft 44 which is spring-loaded for limited or differential downward movement in the threaded shaft 43 upon application of a force correspondiing to the weight of a tire band T on the tire support mechanism 41. A generally circular pan or disc 45 is supported on the upper end of the shaft 44 by inserting it thereover. Pan 45 is preferably embossed or formed on both faces into tiered circular shoulder contours having diameters corresponding to the various tire band diameters. The thus formed pan is reversible so that either face may be used as the upper or tire band support surface, thereby affording a multiplicity of different diameter circular shoulder contours to accommodate a wide range of tire band bead diameters.

An electrical limit switch 46 is mounted below the lower end of the shaft 44 for sequential actuation by the differential downward movement of the shaft 44 upon loading of a tire band T onto the pan 45. Switch 46 thus senses the presence of a tire band T on the pan 45 and transmits a signal to the above-mentioned master electrical control for the loader and press.

Referring now to FIGS. 1 and 3, and the up and down positions of the band holder mechanisms 40 depicted therein, a downwardly extending guide T-bar 50 is secured to the jib arm or boom 22 of each loader 20 in accurate parallelism to the mast or stanchion 21, the axes of the lower press mold sections 12, and the piston rods 37 of the reciprocating fluid motors 35. The web 51 joining the legs 52 of each guide T-bar 50 is slideably engaged by a guide follower member, such as straddling plate 53, vertically movable with and connected to the band holder mechanism 40 by a horizontal guide arm 54.

Figures 5, 6:
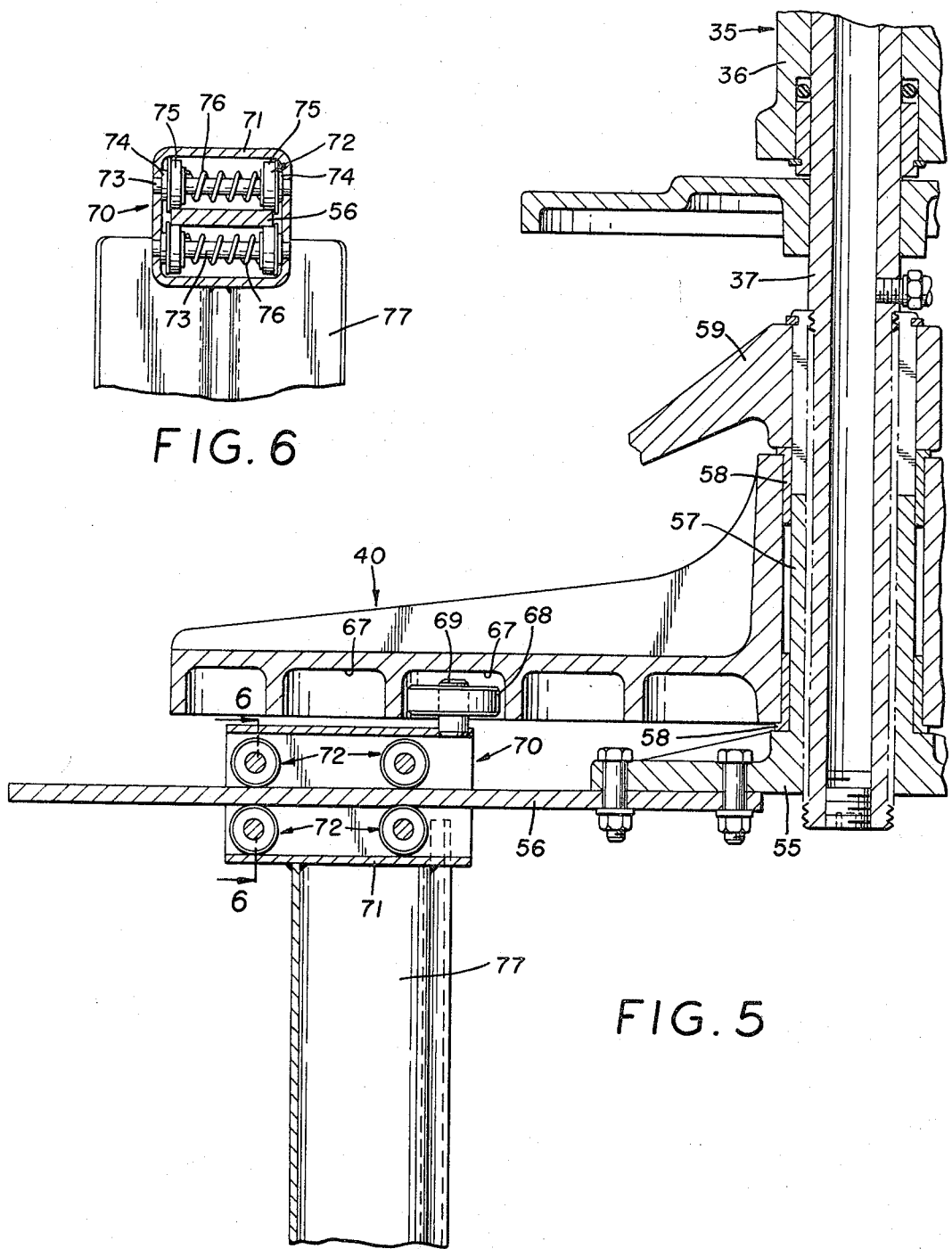
FIG. 5 is an enlarged side sectional view at lines 5—5 in FIG. 2.
FIG. 6 is a sectional view on lines 6—6 in FIG. 5.

As best seen in FIGS. 2–5, an improved band holder or chuck mechanism 40 is carried at the lower end of each piston rod 37 for reciprocation therewith. Referring particularly to FIG. 5, a hub member 55 is threaded onto the lower end of the piston rod 37 and has bolted thereto a plurality of radially extending arms or flat rail-spokes 56. Hub member 55 is formed with an upwardly extending spindle 57 with sleeve bushings 58 press-fit thereon at each end. A collar clevis-bracket 59 is also threaded onto the piston rod 37 above and abutting the spindle 57 of the hub member 55. Collar clevis-bracket 59 is held in position on rod 37 by a clamp bolt 59′ which may be loosened for rotational adjustment of the chuck mechanism 40 as described below. A circular spider 60 is rotatably mounted on the sleeve bushings 58 between the hub member 55 and the collar clevis-bracket 59.

As best seen in FIG. 2, collar clevis-bracket 59 is pin-connected to the base-clevis 61 of a double-acting reciprocating fluid motor or air cylinder 62, the piston rod 63 of which is pin-connected by rod-clevis 64 to a bracket plate 65. Plate 65 is bolted to a boss 66 on the spider 60. Thus, upon selective actuation of the air cylinder 62 the spider 60 may be partially rotated or urged in either a clockwise or counterclockwise direction. The starting point for the partial rotation of spider 60 by cylinder 62 may be conveniently selectively adjusted manually by loosening clamp bolt 59′ and turning the collar clevis-bracket 59.

Figure 9:
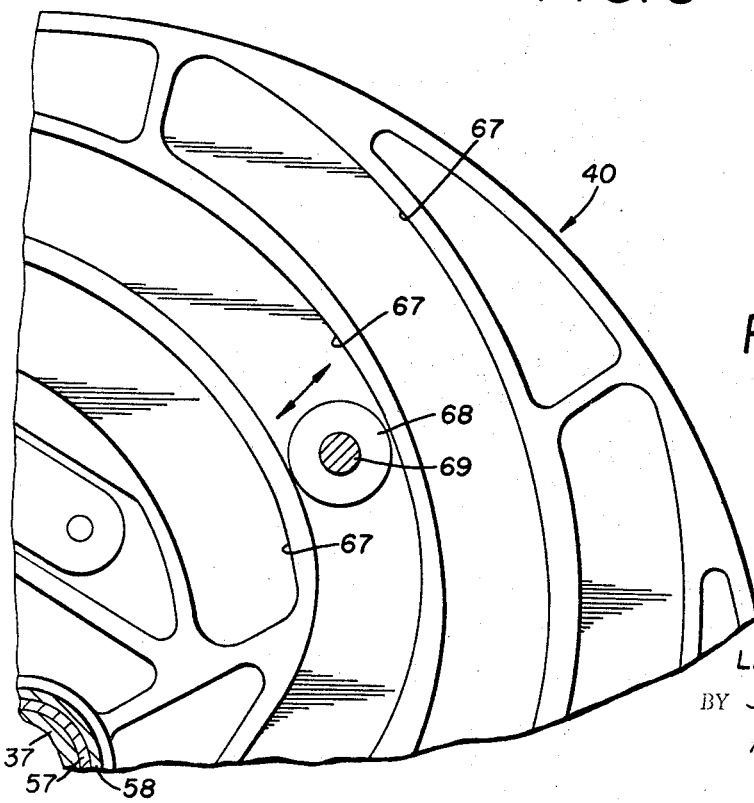
FIG. 9 is an enlarged bottom sectional view on lines 9—9 in FIG. 3.

As shown in the section views of FIGS. 5 and 7, the underside of spider 60 is formed into a variable pitch scroll cam with a plurality of recessed cam channels or trackways 67 which, as seen in FIG. 9, have a generally spiral or skewed curvilinear orientation. Scroll cam channels 67 may be formed, for example, at a spiral or skew angle of 16° to 40° extending through an arc of 90° to 100°. Cam follower rollers 68 operatively disposed in scroll cam channels 67 are journaled on axles 69 on paddle trolley assemblies 70 which are radially movable along the arms or flat rail-spokes 56. The camming action produced between scroll cam channels 67 and rollers 68 upon partial rotation of the spider 60 by selective actuation of the air cylinder 62 thus produces radial movement of the paddle trolley assemblies 70.

Referring to FIGS. 5 and 6, each paddle trolley assembly 70 has a square tubular housing 71 telescoped over one of the flat rail-spokes 56. A pair of guide bogies 72 are journaled in the housing 71 above and below the rail-spokes 56. Each guide bogie 72 consists of an axle 73, a pair of thrust bearings 74, a pair of rail-rollers 75, and a thrust spacer spring 76.

Depending from and secured to each paddle trolley assembly 70, as by welding to the housing 71, is a tire band gripping paddle member 77 which is contoured to grasp the exterior surface of a conventional or flat-built tire band T. Each paddle 77 is also formed with a transversely curved segment or shoe 78, adapted to contact the inner surface of a beaded edge of a tire band (T or T′), and is provided with a lateral outwardly extending pusher plate 79, adapted to contact the upper or side surface of a beaded edge of a tire band. The holder paddle shoes 78 contact the tire band B at spaced apart areas and, when moved radially outwardly by trolley assemblies 70, have a diameter greater than the maximum diameter of the upper portions of the center mechanism 15 when partially or fully axially elongated.

Bead gripping loading thus afforded by provision of shoes 78 and pusher plates 79 may be utilized for loading either conventional flat-built tire bands T, especially of the type built on "undercut" drums so as to have radially inset beads, or for loading partially shaped, preformed, or radial ply tire bands T.

As illustrated in FIGS. 4 and 7, one paddle 77 of the tire band chuck or holder mechanism 40 preferably has a hinged or swiveling lower end (77′, 78′, 79′) with an eccentric actuator portion 80 thereon to actuate an electrical limit switch 81 upon gripping of a tire band (T or T′). Actuation of switch 81 transmits a signal to the aforementioned master electrical controller for the tire press and loader, thereby initiating or permitting further sequential automatic operations.

As illustrated by the phantom line positions of the paddles 77 in FIG. 7, the tire band chuck or holder mechanism 40 affords a wide range of radial adjustment by virtue of the plurality of smoothly curved scroll cam channels 67 on the underside of the spider 60 which may be selectively aligned with the cam follower rollers 68 on the paddle trolleys 70 by convenient adjustment of the collar-clevis bracket 59′. In an actual embodiment of the chuck or holder mechanism 40, it has been found that such a mechanism provides substantially constant band holding forces or presures over a substantially continuous range of diameters, as defined by paddles 77, from eight inches minimum to twenty and one-half inches maximum, thereby accommodating virtually the full range of sizes of tire bands for passenger cars or light vehicles.

It should therefore be apparent that the several objects and advantages of the invention may be achieved with apparatus according to the preferred embodiment just described, and it is appropriate and proper that the scope of the invention be measured solely by the appended claims and not be the details of the foregoing disclosure.

What is claimed is:

1. In apparatus for loading unvulcanized tire bands into registry with the lower mold section of a press for shaping and curing tires; a plurality of radially movable band gripping paddle means, said paddle means being adapted to selectively grip either the exterior surface of the band or the interior edge of the upper bead region of the band, cam means comprising, a rotatable spider having a plurality of skewed curvilinear cam channels therein, a plurality of radially extending rail-spokes, a trolley assembly radially movably carried on each said rail-spoke, said paddle means depending from said trolley assemblies, and a cam follower on each said trolley riding in one of said cam channels, whereby rotation of said spider effects a direct line motion of said trolley assemblies and said paddle means transverse of the axis of and parallel to said spider.

2. In apparatus, according to claim 1, wherein one of said paddle means has an electrical switch means and associated actuator means to sense the presence of a said tire band.

3. In apparatus for loading unvulcanized tire bands into registry with the lower mold section of a press for shaping and curing tires; a plurality of radially movable band gripping paddle means, said paddle means being adapted to selectively grip either the exterior surface of the band or the interior edge of the upper bead region of the band, cam means comprising a rotatable spider transverse to and above said paddle means, said spider carrying radially moving follower means for effecting a direct line motion of said paddle means transverse of the axis of and parallel to said spider, said cam means being operatively mechanically connected to said paddle means, and power actuated means to selectively rotate said spider.

4. In apparatus for loading unvulcanized tire bands into registry with the lower mold section of a press for shaping and curing tires, according to claim 3, said apparatus having vertical mast means, horizontal jib arm means rotatably stanchioned on said mast means, means to rotate said jib arm means, and reciprocating means vertically movably mounting said band gripping paddle means at the outer end of said jib arm means; said apparatus further comprising, vertically extending guide means depending from said jib arm means and guide follower means operatively mechanically connected to said paddle means for vertical movement therewith, said guide follower means engaging said guide means during vertical travel of said paddle means to maintain parallelism of the path of said travel with respect to said mast means and to the axis of said lower mold section.

5. In apparatus for loading unvulcanized tire bands into registry with the lower mold section of a press for shaping and curing tires, according to claim 4; wherein said means to rotate and jib arm means comprises radial movement fluid motor means.

6. A tire band holder chuck mechanism for automatic press loading apparatus comprising; a vertically disposed shaft, a plurality of radially extending rail-spokes mounted on the lower end of said shaft, a spider rotatably journaled on said shaft above said rail-spokes and having a plurality of skewed curvilinear cam channels on the underside thereof, a trolley radially movably carried on each said rail-spoke, a cam follower mounted on each said trolley and riding in one of said cam channels, a band gripping paddle depending from each said trolley, and reversible power means to selectively rotate said spider on said shaft, whereby the camming action of said spider produces radial movement of said trolleys and linear increment of the said paddles depending therefrom.

7. A tire band holder chuck mechanism, according to claim 6, wherein said trolleys have pairs of bogies riding on the bottom and top sides of said rail-spokes to maintain alignment of said trolleys during radial movement thereof.

8. A tire band holder chuck mechanism, according to claim 6, wherein said paddles are contoured and provided with shoes and pusher plates at their lower ends for selectively gripping either the exterior surface or the interior edge of the upper bead region of a said band.

References Cited

UNITED STATES PATENTS

| | | |
|---|---|---|
| 378,896 | 3/1888 | Mooney. |
| 2,814,073 | 11/1957 | Van Scoyk. |
| 2,837,967 | 6/1958 | MacDonald. |
| 2,927,343 | 3/1960 | Soderquist. |
| 2,976,566 | 3/1961 | Soderquist. |
| 2,997,738 | 8/1961 | Soderquist. |
| 3,030,658 | 4/1962 | Soderquist. |
| 3,053,400 | 9/1962 | Erickson et al. |
| 3,065,499 | 11/1962 | Brundage et al. |
| 3,065,503 | 11/1962 | Mallory et al. |
| 3,091,801 | 6/1963 | Erickson. |
| 3,097,394 | 7/1963 | Mallory et al. |
| 3,134,136 | 5/1964 | Soderquist. |
| 3,167,810 | 2/1965 | Soderquist. |
| 3,222,715 | 12/1965 | Harris. |
| 3,229,329 | 1/1966 | Heston et al. |
| 3,260,782 | 7/1966 | Soderquist. |
| 3,267,515 | 8/1966 | Ulm. |
| 3,298,066 | 1/1967 | Soderquist. |

J. HOWARD FLINT, JR., *Primary Examiner.*

UNITED STATES PATENT OFFICE

CERTIFICATE OF CORRECTION

Patent No. 3,380,115                                                  April 30, 1968

Leslie E. Soderquist

It is certified that error appears in the above identified patent and that said Letters Patent are hereby corrected as shown below:

Column 1, line 53, "such press loaders" should read -- such prior press loaders --. Column 2, line 9, "pully" should read -- pulley --. Column 3, line 45, "uper" should read -- upper --; line 63, "actautor" should read -- actuator --. Column 6, line 25, "presures" should read -- pressures --. Column 7, line 16, "and jib arm" should read -- said jib arm --. Column 8, line 15, "2,837,967" should read -- 2,837,767 --.

Signed and sealed this 21st day of October 1969.

(SEAL)
Attest:

Edward M. Fletcher, Jr.
Attesting Officer

WILLIAM E. SCHUYLER, JR.
Commissioner of Patents